United States Patent [19]

LeCompte

[11] Patent Number: 5,189,253
[45] Date of Patent: Feb. 23, 1993

[54] FILAMENT DISPENSER

[75] Inventor: George W. LeCompte, Tucson, Ariz.

[73] Assignee: Hughes Aircraft Company, Los Angeles, Calif.

[21] Appl. No.: 556,235

[22] Filed: Jul. 20, 1990

[51] Int. Cl.⁵ ............................................. F42B 12/68
[52] U.S. Cl. ................................. 102/504; 244/3.12; 242/128
[58] Field of Search ............... 102/504; 242/128, 170, 242/171, 172; 244/3.12

[56] References Cited

U.S. PATENT DOCUMENTS

| | | | |
|---|---|---|---|
| 2,469,533 | 5/1949 | Wellcome | 102/504 |
| 3,013,494 | 12/1961 | Chanut | 244/3.12 |
| 3,089,588 | 5/1963 | Correll | 242/170 |
| 3,114,456 | 12/1963 | Van Billiard | 242/159 |
| 3,156,185 | 11/1964 | Hermann et al. | 102/374 |
| 3,319,781 | 5/1967 | Simpson et al. | 206/389 |
| 3,613,619 | 10/1971 | De Nobel et al. | 114/21.1 |
| 3,673,963 | 7/1972 | McGowan | 102/504 |
| 3,926,386 | 12/1975 | Stahmann et al. | 242/118 |
| 4,206,889 | 6/1980 | Adelhardt et al. | 242/128 |
| 4,271,761 | 6/1981 | Canning et al. | 242/128 |
| 4,326,657 | 4/1982 | Arpin et al. | 102/504 |
| 4,624,185 | 11/1986 | Emerson | 244/3.12 |
| 4,770,370 | 9/1988 | Pinson | 244/3.12 |
| 4,974,793 | 12/1990 | Pinson | 244/3.12 |
| 5,005,930 | 4/1991 | Schotter | 244/3.12 |
| 5,022,603 | 6/1991 | Maree et al. | 102/504 |
| 5,052,636 | 10/1991 | Chesler | 102/504 |

FOREIGN PATENT DOCUMENTS 3201019 8/1983 Fed. Rep. of Germany ...... 244/312

Primary Examiner—Stephen M. Johnson
Attorney, Agent, or Firm—R. M. Heald; C. D. Brown; W. K. Denson-Low

[57] ABSTRACT

A filament dispenser (18) for a missile data link has a bobbin with end flanges (24, 26) fixedly mounted to the missile (86). A shroud (30) is spaced opposite the filament pack for frictionally engaging a ballooning filament (30) during dispensing to reduce ballooning amplitude. A second version passes the dispensed filament back through an opening (38) in the bobbin for reverse dispensing. A third version is similar to the first version and, in addition, on leaving the bobbin filament (48) passes through a relatively small diameter ring (52). In a fourth version, similar to the second version, the filament (80) passes through a constraining ring (82) located within the bobbin opening (38). In a final version the filament dispensed from a pack (92) passes around a curved end flange (90) then back over a curved surface (106) and through an opening (102) forming two balloons (109, 110) and helix elimination.

5 Claims, 3 Drawing Sheets

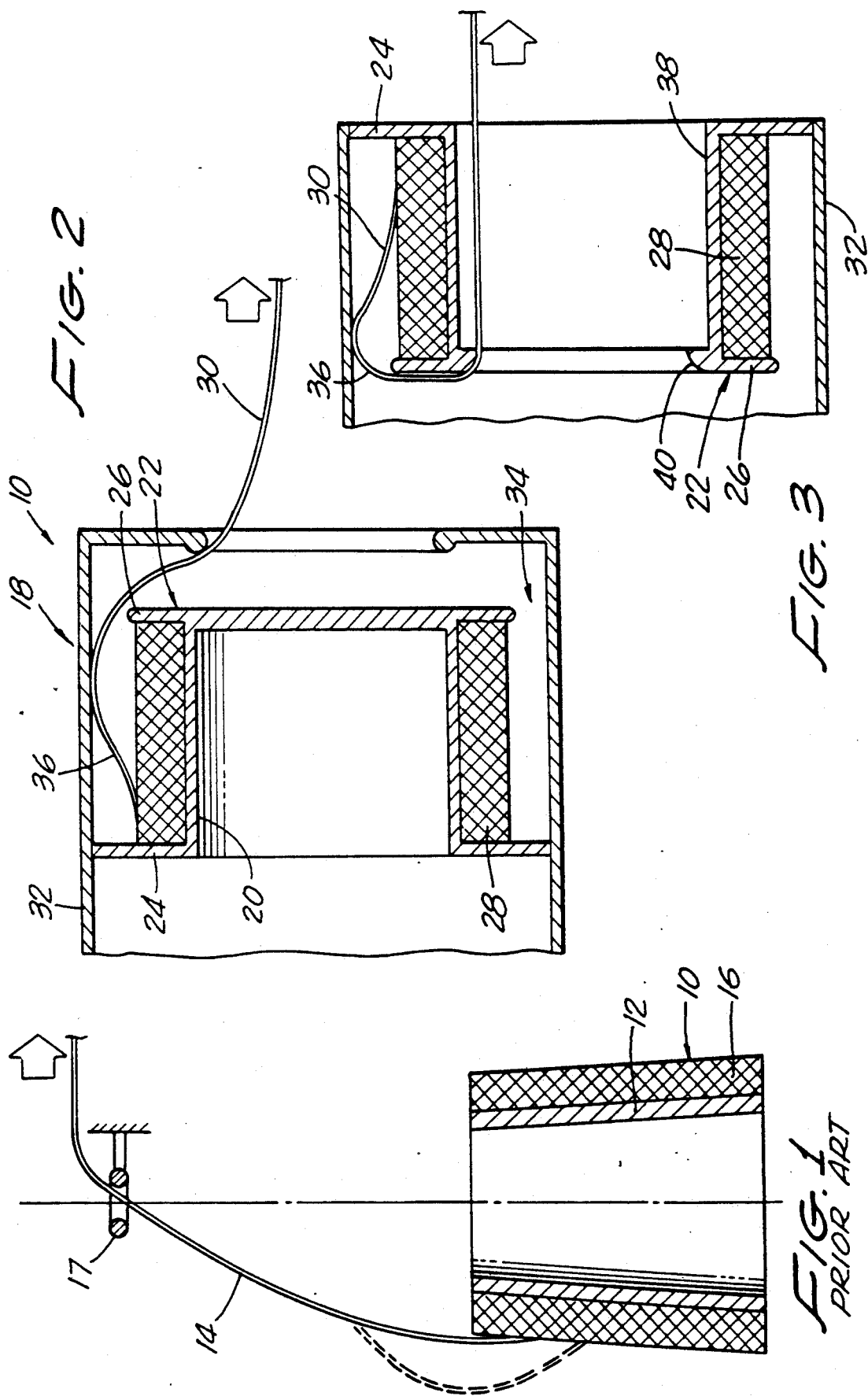

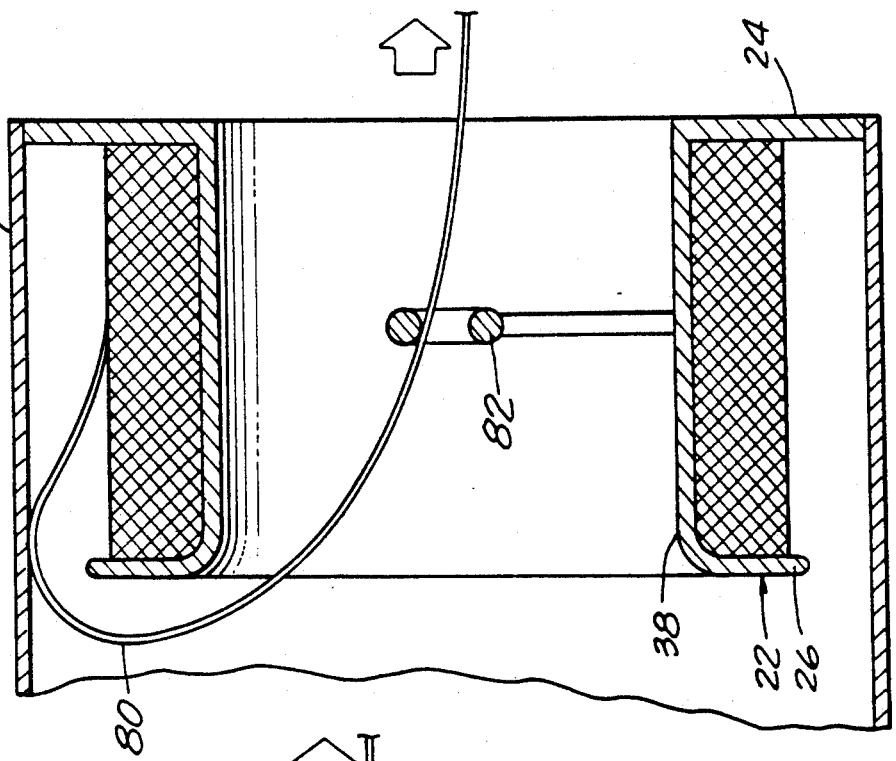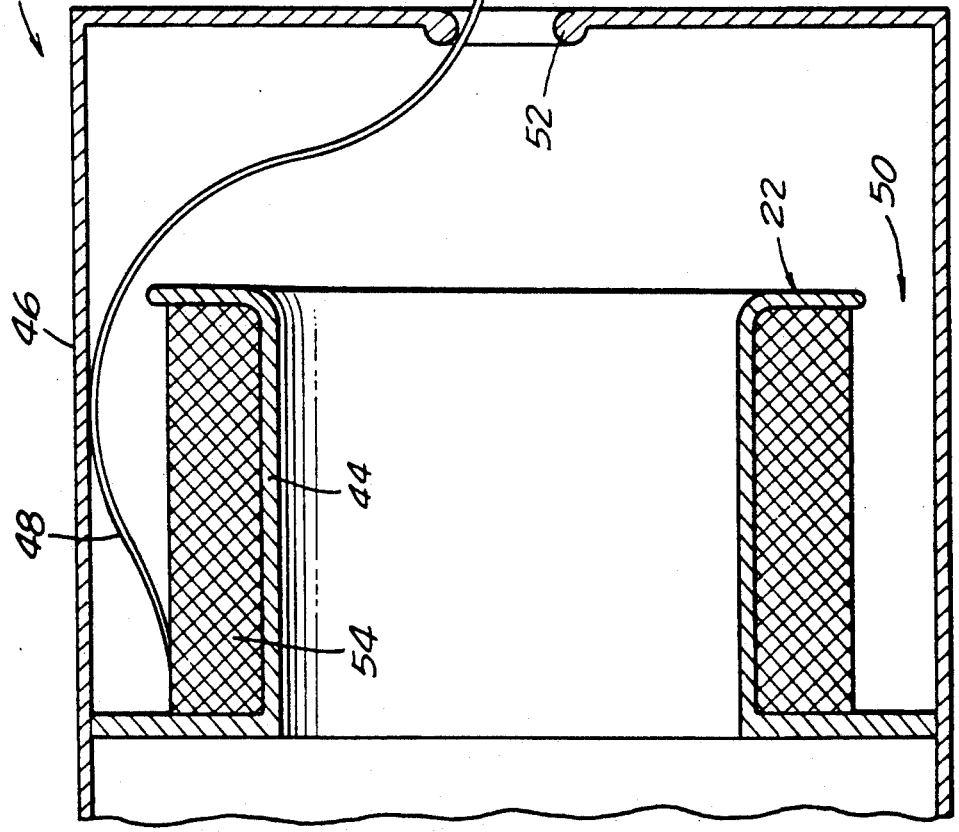

FILAMENT DISPENSER

BACKGROUND OF THE INVENTION

1. Field of the Invention

The present invention relates generally to apparatus for dispensing filament on a missile or other airborne vehicle to establish a data link with apparatus at the launching site, and, more particularly, to such filament dispensing apparatus which does not require adhesive for maintaining wound pack integrity and has improved filament payout characteristics.

2. Description of Related Art

Many present day weapon systems include a launched missile having a wire or optical fiber data link, one end of which is connected to on-board missile control apparatus while the other end pays out at a high rate of speed to maintain interconnection with other apparatus at the launch site.

A successful data link must meet several criteria. A first one is that filament payout must be accomplished with an acceptably lower tension on the filament to avoid breakage, or, in the case of an optical fiber, to prevent what is termed "micro bending" which reduces the quality and efficiency of signal transmission. Also, the filament wound package or pack must be stable so as to enable storage without having the winding collapse from its wound configuration. In addition, the winding pack should be as dense and compact as possible so that it will take up no more space than absolutely necessary.

One frequently encountered present day filament dispenser consists of a generally cylindrical tapered canister fixedly located at the aft end of the vehicle with its longitudinal axis generally parallel to that of the vehicle. During payout, the filament is directly peeled off the end of the canister paying out in a somewhat extended helical configuration. Another known dispenser includes a cylindrical canister with the filament wound so as to be able to effect payout from the inside of the filament package, this form being especially advantageous for torpedo and sonobuoy applications.

To maintain the geometric integrity of a filament pack it has been usual practice to apply an adhesive to the filament during winding or to the pack itself. It would be desirable, however, to be able to eliminate the use of adhesive since it is a dominant payout speed limiting factor in stationary dispensers where the peel bend stress induced by the force required to fracture the adhesive binder can be substantial. There is also a continuing problem with adhesive aging which means that where there is to be storage for any considerable length of time, there is a serious concern that deterioration will make it incapable of functioning.

Another matter of concern is the tendency for production of a whirling motion of a filament on dispensing from a moving vehicle which results in a further requirement that the dispenser be mounted at the aft end of the vehicle, or that it be mounted free from possible obstructions. It would, therefore, be highly desirable to be able to damp the helix formed in a dispensed filament and, to the extent possible, obtain a helix controlled payout. If this can be achieved then there would be greater choice in canister location and direction of payout.

SUMMARY OF THE INVENTION

In accordance with a first version of the present invention, a canister on which the filament is to be wound includes on its circumferential outer periphery a winding region defined at opposite sides by first and second flanges. Immediately opposite the winding region is a shroud consisting of a continuous wall spaced somewhat from what would be the outermost winding layer. The filament is dispensed through a ringlike opening at an end of the canister between the shroud and facing flange.

In this first version, the extent that the ballooning occurs is limited by physical contact with the shroud which prevents filament movement from being violently divergent as can occur in the high speed removal from a fixed canister where there is no impediment to filament lateral movement.

In another version, the canister of the first version has a central opening. On payout, the filament moves over the flange and back through the central opening in what might be termed "reverse" payout.

In a third embodiment, the filament is dispensed from the end of a tapered cylindrical canister through a ring guide of relatively small inner diameter as compared to the canister size. The ring constraint removes a substantial amount of the helix which, in turn, reduces the tendency of filament ballooning as it comes off the pack.

In yet a further or fourth embodiment, the filament pack and surrounding walls are arranged so that the filament will move in a first direction over a curved flange defining the filament pack and then back in a reverse direction where it encounters a further curved surface to change its direction once more before exiting from the canister assembly. As compared to the other versions, the filament here changes directions twice before leaving the dispenser and, in effect, produces several balloons and will be referred to as a cascade-balloon helix dampener.

BRIEF DESCRIPTION OF THE DRAWINGS

In the accompanying drawings:

FIG. 1 is a typical prior art dispenser;

FIG. 2 is a side elevational, sectional view of a first embodiment of the invention;

FIG. 3 is another embodiment using reverse payout;

FIG. 4 is a side elevational, sectional view of a further embodiment for eliminating dispensing helix;

FIG. 6 is a side elevational, sectional view of another embodiment of the invention including a helix damper.

DESCRIPTION OF THE PREFERRED EMBODIMENTS

Figure 5:
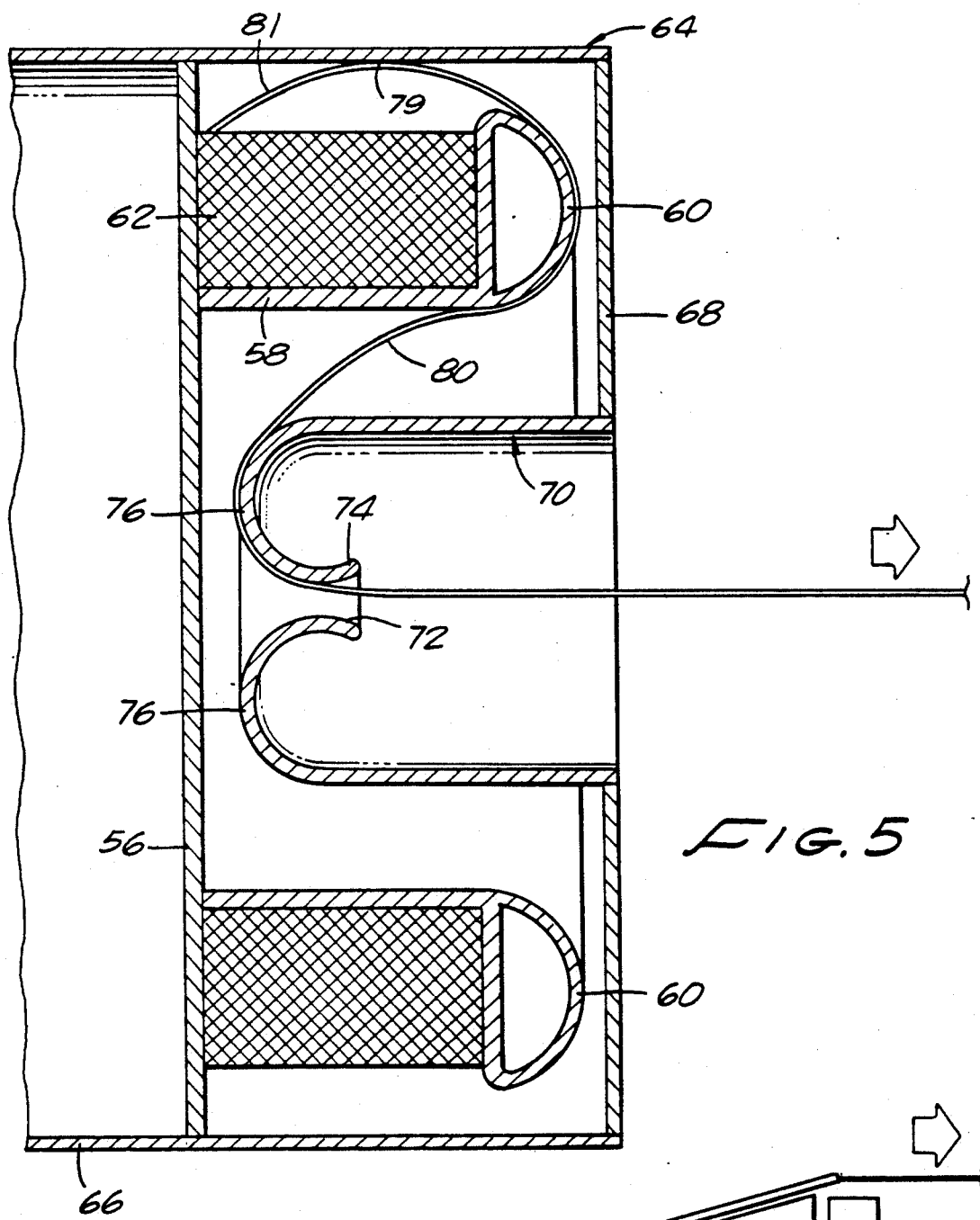
FIG. 5 is a further embodiment eliminating dispensing helix and utilizing cascading ballooning shown in sectional, elevational view.

In the textile industry when a filament is taken off a wound bobbin in a manner that constrains the amplitude of the helix which is formed (e.g., drawing through an eyelet), a phenomenon occurs in that the filament tends to lift off the bobbin outer layer or "balloons". When the term balloon or ballooning is used herein, it will be understood to mean this tendency for a filament (e.g., wire or optical fiber) to move outwardly away from a bobbin stack during filament payout. Also, as will be shown, the invention relies in part upon ballooning to achieve advantageous payout of a filament, wire or optical fiber, from a fixed canister.

With reference now to FIG. 1 of the drawings, a typical known canister 10 is shown including a tapered drum 12 with a length of filament 14 helically wound into a pack 16 onto the outer peripheral surface. In the usual case the drum axis is arranged parallel to a vehicle's direction of movement and the filament is dispensed off one end. For various reasons, it may be desirable to guide or duct a dispensed filament along predetermined path (e.g., ring 17) and this will reduce the helix of the dispensed filament which, in turn, induces ballooning (dashed line). If ballooning is excessive the filament can become entangled and break or become damaged.

Turning now to the drawings, and particularly FIG. 2, a first form of filament dispenser of this invention is enumerated generally as 18 and is seen to include a base wall 20 formed into a cylinder or drum 22. A first flange 24 is an annular wall secured to one edge of the base wall 20. A second flange 26, also annular, is secured to the base wall opposite edge and differs from the first flange primarily in extending radially outwardly from the base wall a lesser amount. The two flanges extend outwardly from the base wall peripheral surface enclosing the sides of a region within which a cylindrical pack 28 of filament 30 is to be wound.

A cylindrical shroud 32 is affixed to the first flange 24 extending in covering relation to the pack 28 and spaced from the outer edge of the second flange to form an access window 34 through which the filament passes during pack winding and payout.

The dispenser 18 with a full winding pack 28 is conveniently mounted aboard a missile or other vehicle with the inner filament end connected to control apparatus on board the vehicle (not shown) while the other filament end shown extending from window 34 connects with apparatus at the launch site. On launch, the filament is rapidly pulled from the pack and passes through the access window. Since the pack is retained between end flanges 24 and 26 the necessity for use of adhesive is eliminated, the disadvantages of which have already been noted.

Ballooning that occurs (as shown at 36) is damped by contact with the shroud 32 where frictional heating dissipates a part of the ballooning energy. Restriction of the amount of ballooning is important since otherwise ballooning can become violently divergent especially where there is high-velocity payout.

FIG. 3 depicts another version patterned generally along the lines of the FIG. 2 embodiment and the same numerals are used for common parts. This embodiment differs in having a central opening 38 extending completely through the drum 22. The dispensed filament in this case is pulled off the pack through access window, back over a rounded and smooth edge wall 40 to pass through the opening 38 to the vehicle exterior. In this version, not only does the shroud hold the ballooning to acceptable limits, but the passage of the filament through the opening reduces helix in the dispensed filament.

FIG. 4 is a further embodiment of dispenser 42 of this invention in which the dispenser winding base 44 is generally cylindrical with a shroud 46 substantially identical to dispenser 18 of FIG. 2. The filament 48 on dispensing through the window 50 passes through a relatively small ring or eyelet 52 which is at least several multiples smaller than the average diameter of the pack 54. The constraining force imposed upon the filament by the ring 52 reduces the helix of the filament resulting in ballooning and the shroud confines the ballooning to acceptable limits.

Certain use environments, such as helicopters and other agile vehicles, require a filament dispenser which can pay out filament over a wide angular range. The embodiment shown in FIG. 5 is excellent for this purpose. FIG. 5 shows an embodiment in which two filament balloons are produced during dispensing and enhanced filament helix diameter reduction is achieved by the additive effect of frictional engagement of the two balloons with opposed surfaces. The dispenser includes a flat plate 56 onto a major surface of which is secured one edge of a cylindrical winding base 58. The opposite winding base edge terminates in a ring flange 60 having a rounded outer surface. The plate 56 and ring flange 60 provide edge support for the intervening filament pack 62 which makes the use of adhesive unnecessary to maintain stack geometric integrity.

An enclosure 64 is of such dimensions and geometry as to enable fitting receipt over the bobbin while maintaining spaced relation to the bobbin parts. More particularly, the enclosure includes a rim wall 66 formed into a cylinder and having an inner diameter sufficient to enable sliding receipt over the plate 56. An annular plate 68 has its outer edges secured to the outer edge of the rim wall 66. A hollow cylinder 70 has one end affixed to the edges defining the central opening in the annular plate and the other end being formed to extend back into the cylinder bore and terminate in a restricted opening 72 with outwardly flaring edge portions 74. The innermost end portions 76 of cylinder 70 are smooth and rounded, as well as being located substantially closer to plate 56 than is the ring flange 60.

When dispensing from the FIG. 5 embodiment, the filament 78 taken from the pack 62 passes over and around the ring flange 60, back through the space between cylinder 70 and winding base 58, and finally over rounded end portions 76 to exit via opening 72. Since the filament experiences two constraints, namely, at 60 and then again at 76, two balloons are formed: a first at 81 and a second at 80. Balloon 81 frictionally engages the inner surface of peripheral wall 66 and balloon 80 contacts the lower surface of base 58, the cumulative effect of these cascaded balloons produces an advantageous substantial reduction in the helical diameter of the payed out filament. The restricted opening 72 also acts as a further helix damper which removes nearly all of the helix rotation energy allowing the filament to exit through a narrow conduit as will be described, for example.

On dispense, the filament 78 contacts the shroud at 79, the outer edge of the ring flange 76 with some frictional heating occurring at each contact surface.

It may be found that additional cascaded balloons are advantageous and that three or more constraining surfaces may intercept the filament prior to final payout. There is a limit to cascade ballooning in that each such filament contact with a surface increases the amount of excess tension in the filament thereby reducing later usefulness in passing the filament through a slender conduit, for example.

FIG. 6 depicts a still further embodiment similar to the "reverse direction" dispenser of FIG. 3 with the addition of means which result in substantially complete elimination of helix. The same numerals are used for identical apparatus parts. The filament 80 on being dispensed over the end flange 26 then turns back and the central passage 38 where it passes through an eyelet or ring 82 of relatively small opening as compared to the average pack diameter (and, thus, the average filament dispensing circle). Operation is similar to that of FIG. 3 only enhanced by the constraint of the eyelet that substantially eliminates helix.

Figure 7:
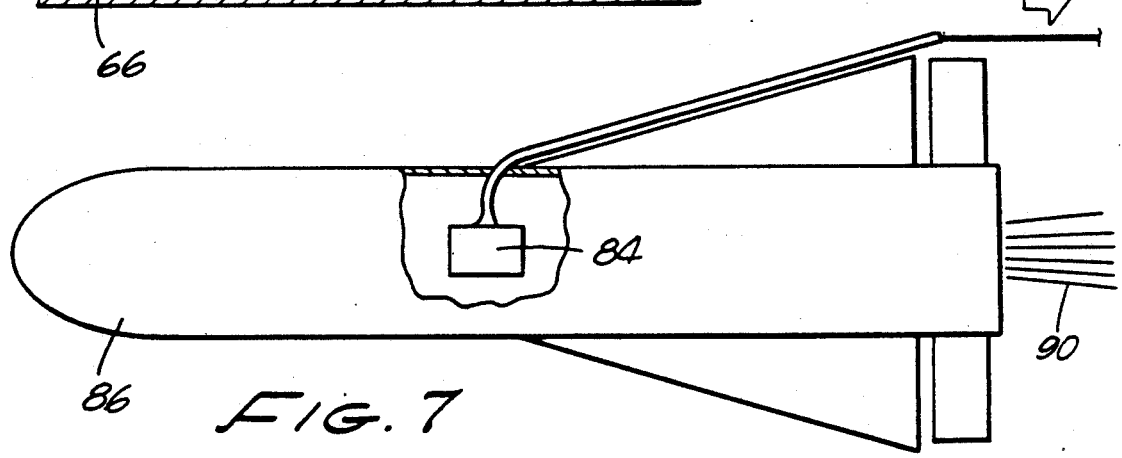
FIG. 7 is a side elevational partially sectional view of a dispenser of the present invention shown in a missile.

A helix elimination filament dispenser, such as shown in FIG. 4, for example, and would be functionally achieved in the FIGS. 5 and 6 embodiments, offers considerable flexibility of choice in locating the dispenser on a missile. FIG. 7 depicts one advantageous possibility where a dispenser 84 which is located midships of a missile 86 and the filament 88 dispensed through an eyelet located to duct payout outside the rocket plume 90. The central location is desirable in that the dispenser would be closer to signal sources and destinations for data transmitted over the link, and where the changing mass experienced during payout would be less disruptive of vehicle dynamics. Furthermore, the reduction in risk of damage to the filament from the plume or to having an excessive amount of filament pulled off the canister by the plume as also desirable.

A primary advantage of the described invention is to eliminate the use of an adhesive which was requisite in certain prior art filament dispensers for producing pack stability.

Although several somewhat preferred embodiments have been disclosed and described in detail herein, it should be understood that this invention is in no sense limited thereby and its scope is to be determined by that of the appended claims.

What is claimed is:

1. Apparatus for dispensing a length of signal carrying filament from storage on board a missile, the filament including one end interconnected with apparatus on board the missile and an opposite end interconnected with separate apparatus at a launch site, comprising:

a bobbin having an outer side and central opening extending completely through the bobbin, wherein the filament is wound about the bobbin outer side to form a pack with opposite sides and a predetermined average diameter;

first and second flanges spaced from one another and extending from the bobbin, each said flange engaging an opposite side of the pack for retaining the pack in a stable configuration prior to payout;

a wall affixed to the first flange and encircling the second flange and the pack, the wall disposed close enough to the bobbin to frictionally engage the filament ballooning from the pack and spaced a sufficient distance from the second flange to form a filament access window of fixed size therebetween, whereby filament dispensing from the pack passes through the access window in a first direction and then passes through the bobbin central opening in a second direction generally opposite to the first direction; and the second flange having a smoothly curved outer end surface for engaging and guiding the filament from the access window.

2. Apparatus as in claim 1, in which there is further provided ring means through which the filament passes after leaving the access window.

3. Apparatus as in claim 1, in which the wall has a generally cylindrical configuration and secured to the first flange, forming a cylindrical space opposite to the outer surface of the pack.

4. Apparatus as in claim 1, in which ring means are positioned within the bobbin central opening, the ring means having an opening through which the filament passes during dispense.

5. Apparatus as in claim 4, in which the bobbin central opening has a central axis and the ring means is located on the central axis and aligned therewith.

* * * * *